United States Patent
Heidrich

(10) Patent No.: US 8,173,308 B2
(45) Date of Patent: May 8, 2012

(54) FUEL CELL SYSTEM AND METHOD OF OPERATING A FUEL CELL SYSTEM

(75) Inventor: Hans-Joerg Heidrich, Ulm (DE)

(73) Assignee: Daimler AG, Stuttgart (DE)

( * ) Notice: Subject to any disclaimer, the term of this patent is extended or adjusted under 35 U.S.C. 154(b) by 151 days.

(21) Appl. No.: 12/743,158

(22) PCT Filed: Nov. 7, 2008

(86) PCT No.: PCT/EP2008/009402
§ 371 (c)(1),
(2), (4) Date: May 14, 2010

(87) PCT Pub. No.: WO2009/062636
PCT Pub. Date: May 22, 2009

(65) Prior Publication Data
US 2010/0255388 A1    Oct. 7, 2010

(30) Foreign Application Priority Data
Nov. 16, 2007  (DE) .......................... 10 2007 054 826

(51) Int. Cl.
*H01M 8/04* (2006.01)
*H01M 8/06* (2006.01)

(52) U.S. Cl. ........................................ 429/413; 429/408

(58) Field of Classification Search .................. 429/413
See application file for complete search history.

(56) References Cited

U.S. PATENT DOCUMENTS
| | | |
|---|---|---|
| 2006/0040144 A1* | 2/2006 | Shimizu et al. ................. 429/12 |
| 2007/0072016 A1* | 3/2007 | St-Pierre et al. ................ 429/13 |
| 2007/0092771 A1  | 4/2007 | Wake et al. |
| 2008/0152961 A1* | 6/2008 | Zhou et al. ..................... 429/13 |

FOREIGN PATENT DOCUMENTS
| | | |
|---|---|---|
| DE | 60 2004 000 440 T2 | 8/2006 |
| JP | 2005-259458 A | 9/2005 |
| JP | 2006-80027 A | 3/2006 |
| JP | 2007-242547 A | 9/2007 |

OTHER PUBLICATIONS
International Search Report dated Feb. 25, 2009 (Three (3) pages).
PCT/ISA/237 (Six (6) pages), Feb. 2009.

* cited by examiner

*Primary Examiner* — John S Maples
(74) *Attorney, Agent, or Firm* — Crowell & Moring LLP

(57) ABSTRACT

In a fuel cell system a specific connection and a valve arrangement make it possible for a compressor to supply precompressed air to a fuel cell stack via a waste gas line, said air then leaving the fuel cell stack via a line which is otherwise an air feed line. In this way, a humidifier may be bypassed. This is sensible in particular during a start phase at low ambient temperatures, during which the fuel cell system is intended to warm up without moisture in the fuel cell stack having a negative effect, for instance by freezing. The compressor may be operated both in the start phase or stop phase and during conventional operation by the same mode of operation.

5 Claims, 1 Drawing Sheet

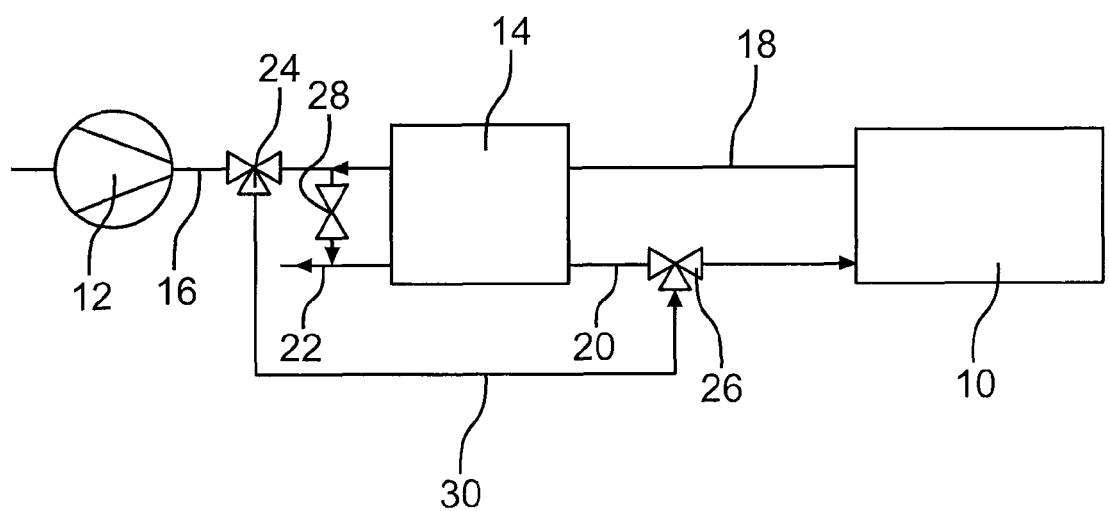

FUEL CELL SYSTEM AND METHOD OF OPERATING A FUEL CELL SYSTEM

BACKGROUND AND SUMMARY OF THE INVENTION

This application is a national stage of PCT International Application No. PCT/EP2008/009402, filed Nov. 7, 2008, which claims priority under 35 U.S.C. §119 to German Patent Application No. 10 2007 054 826.7, filed Nov. 16, 2007, the entire disclosure of which is herein expressly incorporated by reference.

The invention relates to a fuel cell system, in which a compressor is connected via a line to a humidifier, which in turn is connected via a second line to a fuel cell stack, at which a waste gas line is provided. The humidifier supplies moisture to the compressed air, conventionally ensuring better operation of the fuel cell stack. However, the moisture is disadvantageous at cold ambient temperatures, since it may lead to icing. It is therefore desirable sensible to remove moisture from the fuel cell stack at the end of operation of a fuel cell system. As far as possible the fuel cell stack should first be preheated on restarting, before moisture is supplied.

It is known from German patent document DE 60 2004 000 440 T2 and Japanese patent document JP 2005-259458 A to cause the compressor to run in the reverse direction after stopping operation of the fuel cell system, so that the compressor sucks air out of the fuel cell stack, coming in particular from the waste gas line, instead of supplying precompressed air to the fuel cell stack, so generating a vacuum in the fuel cell stack and causing water to evaporate.

However, in practice it has proven difficult to cause a compressor simply to run in the reverse direction, bringing about a pumping action. A conventionally constructed compressor suffers from damage if it is simply operated in reverse relative to the conventional operating direction.

One object of the invention, therefore, is to provide a fuel cell system of the above-stated type in which it is possible to work with conventional compressors while nonetheless achieving a good cold starting capacity.

This and other objects and advantages are achieved by the fuel cell system according to the invention, in which there is a connection between a compressor and a waste gas line, and a valve arrangement serves to open up precisely this connection. The valve arrangement is designed simultaneously to close off the first line. By opening up the connection, air compressed by the compressor is passed via the waste gas line to the fuel cell stack. By blocking the first line, the air is in any case caused to bypass the humidifier.

The invention is based on the recognition that the same effect as that of a pump may be achieved when the air continues to be compressed to an elevated pressure but is supplied in reverse manner. A concrete option for achieving the invention is to provide a specific valve arrangement.

If the humidifier is a gas-to-gas humidifier, which is usually the case and is preferred when applying the invention, the waste gas line is also connected to the humidifier, continues in the humidifier itself and then leads outside the humidifier into an outlet for the waste gas. It is then possible to provide a valve arrangement which comprises a first three-way valve in the first line (i.e., between compressor and humidifier) and a second three-way valve in the waste gas line. Between the first three-way valve and the humidifier a connection to the outlet may lead off, in which a further valve is then arranged. The air then actually flows through the entire arrangement in the reverse direction, is passed from the compressor to the waste gas line, from the waste gas line through the fuel cell stack, from the fuel cell stack to the second line, via which air is otherwise supplied, then to the humidifier. Because the air leaves the humidifier via the first line, it has to pass by way of the connection to the outlet, where it may exit.

In the prior art described initially, the compressor is operated in the reverse direction so as to function as a pump after stopping operation of the fuel cell system, for the purpose of evaporating water. The present invention now makes it possible to supply dry air even while restarting or upon stopping operation despite the presence of a humidifier, specifically in a start phase or in a stop phase, by passing air to the fuel cell stack via the air discharge line.

It should be noted that, in the method according to the invention, a conventional compressor is preferably used, which needs not necessarily be operable in the reverse direction. This works in that a compressor compresses air both in the start and stop phases and during conventional operation, by the same given mode of operation. Start and stop phases and conventional operation are distinguished only by the manner in which the valves of a valve arrangement are switched.

A further advantage of the invention is that, even during the drying phase, (i.e., when dry air is supplied to the fuel cell), the fuel cell may still generate power in a considerable quantity up to the maximum possible value.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing shows the structure of a part of a fuel cell system in which the present invention is realized.

DETAILED DESCRIPTION OF THE DRAWINGS

In the fuel cell system shown in the FIGURE, a fuel cell stack 10 is intended to be supplied with compressed air by a compressor 12. In conventional operation, the compressed air is humidified by a gas-to-gas humidifier 14. To this end, the compressor 12 is connected via a first line 16 to the humidifier 14, and the humidifier 14 is connected via a second line 18 to the fuel cell stack. From the fuel cell stack 10 a waste gas line 20 leads in turn to the humidifier, and an outlet 22 leads away from the humidifier. In the first line 16 a three-way valve 24 is provided and in the waste gas line 20 a three-way valve 26. A further valve 28 connects the first line 16 to the outlet 22 on the humidifier side of the three-way valve 24.

In conventional operation, on the one hand the valve 28 is closed. The three-way valves 24 and 26 are switched in such a way that the gas may pass through in the horizontal direction in the FIGURE. In other words, the compressor 12 compresses air, which passes via the three-way valve 24 to the humidifier 14, through the second line 18 to the fuel cell stack 10, where the oxygen present in the air reacts with hydrogen to yield water, and the waste gas is conveyed back to the humidifier 14 by way of the three-way valve 26. In the humidifier 14 the waste gas releases moisture to the supplied air via membranes. The waste gas which has released moisture exits at the outlet 22.

The three-way valves 24 and 26 may now also respectively connect the compressor end of the first line 16 to a connecting line 30 and the fuel cell end of the waste gas line 20 to said connecting line 30. If the valve 28 is now opened at the same time, the air may flow differently from in the above-described conventional operation, namely according to the arrows shown in the FIGURE: Precompressed air passes from the compressor 12 through the three-way valve 24 into the connecting line 30, then from the three-way valve 26 to the fuel cell stack 10, where precompressed air then arrives, as desired, which has not been humidified by the humidifier 14. The fuel cell stack 10 may then be gradually heated. The waste gas leaves the fuel cell stack 10 via the second line 18 towards the humidifier 14, then via the valve 28 to the outlet 22, so reaching the outside. The line 18, which is otherwise a feed line, is thus used to remove the waste gas, and the line 20, which is otherwise a waste gas line, is used to supply air. This proceeds until the fuel cell stack 10 is sufficiently warm (i.e., has reached an optimum operating temperature). Then operation is switched back to conventional operation, with humidified air being supplied to the fuel cell stack 10.

Alternatively, the changeover to conventional operation may also proceed after a given period has elapsed or once a given moisture status of the fuel cell has been achieved.

A further advantage is that, during the drying phase, i.e., when dry air is supplied to the fuel cell, the wet side of the humidifier is not dried out. Thus, on changeover back to normal operation, full humidification capacity is immediately available to the fuel cell.

In a further preferred embodiment, a heat exchanger with its own cooling medium (not shown) is arranged in the line 16 in order to adjust the temperature of the air compressed by the compressor 12, and simultaneously heated to a range tolerable for the components located downstream, such as humidifier 14 and fuel cell 10. The heat exchanger may preferably be arranged as a gas-to-gas heat exchanger in the line 16 between compressor 12 and valve 24 as well as in the outlet line 22 with the fuel cell outlet air as cooling medium.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system, comprising:
   a fuel cell stack;
   a compressor;
   a first line which connects the compressor to a humidifier;
   a second line which connects the humidifier to the fuel cell stack;
   a waste gas line provided at the fuel cell stack;
   a third line connecting the compressor to the waste gas line; and
   a valve arrangement which serves to open up said third line and at the same time to close off at least a section of the first line, such that air compressed by the compressor is conveyed to bypass the humidifier, via the waste gas line, to the fuel cell stack.

2. The fuel cell system as claimed in claim 1, wherein:
   the humidifier is a gas-to-gas humidifier;
   the waste gas line is connected to the humidifier;
   the humidifier comprises an outlet for the waste gas;
   the valve arrangement comprises a first three-way valve in the first line and a second three-way valve in the waste gas line; and
   a further valve is arranged in a connection to the outlet leading off from the first line at the humidifier end, downstream of the first three-way valve.

3. The fuel cell system as claimed in claim 1, wherein a heat exchanger with its own cooling medium is arranged in the first line.

4. The fuel cell system as claimed in claim 3, wherein the heat exchanger is a gas-to-gas heat exchanger.

5. The fuel cell system as claimed in claim 3, wherein:
   the cooling medium for the gas-to-gas heat exchanger is the fuel cell outlet air; and
   the gas-to-gas heat exchanger is arranged in the outlet.

\* \* \* \* \*